US005583995A

United States Patent [19]

Gardner et al.

[11] Patent Number: 5,583,995

[45] Date of Patent: Dec. 10, 1996

[54] APPARATUS AND METHOD FOR DATA STORAGE AND RETRIEVAL USING BANDWIDTH ALLOCATION

[75] Inventors: Alan S. Gardner, Potomac, Md.; Rodney D. McElrath, Fairfax; Stephen L. Harvey, Port Haywood, both of Va.

[73] Assignee: MRJ, Inc., Fairfax, Va.

[21] Appl. No.: 380,657

[22] Filed: Jan. 30, 1995

[51] Int. Cl.$^6$ .................... H04N 7/173

[52] U.S. Cl. .................... 395/200.09; 348/7; 455/4.1

[58] Field of Search .................... 348/6, 7, 8, 12, 348/13; 455/3.1, 4.1, 5.1, 6.3; 395/200.01, 200.09, 200.1, 200.13, 200.15, 858, 856, 600; 364/246, 246.3, 236.2

[56] References Cited

U.S. PATENT DOCUMENTS

| | | | |
|---|---|---|---|
| 4,920,432 | 4/1990 | Eggers et al. | 360/331 |
| 5,093,718 | 3/1992 | Hoarty et al. | 348/65 |
| 5,132,992 | 7/1992 | Yurt et al. | 395/240 |
| 5,133,079 | 7/1992 | Ballantyne et al. | 455/4.1 |
| 5,166,939 | 11/1992 | Jaffe et al. | 371/40.1 |
| 5,237,658 | 8/1993 | Walker et al. | 395/858 |
| 5,274,645 | 12/1993 | Idleman et al. | 395/182.04 |
| 5,305,438 | 4/1994 | MacKay et al. | 395/164 |
| 5,371,532 | 12/1994 | Gelman et al. | 348/7 |
| 5,389,963 | 2/1995 | Lepley et al. | 348/7 |
| 5,473,362 | 12/1995 | Fitzgerald et al. | 348/7 |

FOREIGN PATENT DOCUMENTS

WO93/16557 8/1993 WIPO .

OTHER PUBLICATIONS

Ganger, Worthington, Hou and Patt, "Disk Arrays High–Performance, High Reliability Storage Subsystems", Mar. 1994.

Tierney, Johnston, Herzog, Hoo, Jim, Lee, Chen, Rotem, "Distributed Parallel Data Storage Systems: A Scalable Approach to High Speed Image Servers", Oct. 1994.

Long, Montague, "Swift/RAID: A Distributed RAID Systems", Summer 1994.

*Primary Examiner*—Victor R. Kostak
*Assistant Examiner*—Nathan J. Flynn
*Attorney, Agent, or Firm*—Banner & Witcoff, Ltd.

[57] ABSTRACT

An apparatus and method is provided for allocating a data file across a plurality of media servers in a network, wherein each media server has associated therewith one or more levels of I/O devices organized in a hierarchical manner. An attempt is made to allocate the storage of data across the I/O devices in such a way that the bandwidth imposed on the devices when the data file is sequentially accessed will be balanced, and optimum use of I/O bandwidths at all points in the system is achieved. This balancing can be done by incorporating knowledge regarding various bottlenecks in the system into the decisionmaking process required for distributing the data blocks.

The method and apparatus further allows bandwidths to be allocated to various clients in the system at the time a data file is opened. Various checks are provided at the time a data file is accessed to ensure that the data rates actually imposed by the requesting client do not exceed that requested by the client at the time the data file was opened. The invention allows for much more efficient use of the I/O resources in a system and ensures that a given configuration will be able to support client requests.

29 Claims, 8 Drawing Sheets

| TEAM | MEDIA SERVERS | TOTAL AVAIL. | CURRENTLY ALLOCATED |
|---|---|---|---|
| 1 | S1, S2, S3 | 12 MB/Sec | 8 MB/Sec |
| 2 | S4, S5 | 12 MB/Sec | 0 MB/Sec |
| 3 | S6, S7 | 20 MB/Sec | 4 MB/Sec |

APPARATUS AND METHOD FOR DATA STORAGE AND RETRIEVAL USING BANDWIDTH ALLOCATION

BACKGROUND OF THE INVENTION

1. Technical Field

This invention relates generally to a multi-media data storage and retrieval system, such as a video-on-demand system, which can provide multiple data streams to one or more clients across a network. More particularly, the invention provides a system and method which allows a plurality of isochronous high bandwidth video data streams to be reliably and efficiently stored and retrieved from a plurality of media servers. In the multi-media data storage and retrieval technical field, video-on-demand represents the most technically demanding case.

2. Related Information

There is an increasing need to provide "video-on-demand" services for such applications as cable television and hotel services. Such applications require high-bandwidth, isochronous (time-guaranteed delivery) data streams over a sustained period of time with high reliability. As an example, hotels conventionally dedicate multiple analog video cassette recorders (VCRs) to provide "on-demand" movie viewing for hotel guests. Each VCR can play only one movie at a time, and thus the number of concurrent movies which can be played is limited by the number of VCRs. Not only is a VCR for each movie played required, but the hotel must estimate the number of copies of each movie required to satisfy a broad array of anticipated viewers. Additionally, the number of VCRs provided must be large enough to support the maximum number of viewers who will concurrently view different movies. This dedication of units and ancillary support is costly. Moreover, VCRs may be unavailable for periods of time during which tapes are rewound and the like.

It would be desirable to provide a video on-demand system which makes much more efficient use of data storage devices and their interconnections. However, newer digital video-on-demand systems are expensive, lack reliability, and generally require a wasteful dedication of storage and computing facilities. For example, bottlenecks in various points of such systems render large amounts of data bandwidth unusable. Thus, they suffer from some of the same problems as conventional analog systems.

Transmitting a single digital real-time video stream which is MPEG encoded creates a requirement to provide 200 kilobyte/second (KB/sec) data transfer rates for two or more hours. Higher quality video streams require rates as high as 1 megabyte per second (MB/sec) or higher. In a network in which multiple video streams must be provided, this creates a requirement to reliably provide many megabytes of isochronous data streams. The loss of a few hundred milliseconds of data will cause an unacceptable disruption in service.

Any video-on-demand system providing multiple data streams should preferably be able to detect and correct errors caused by failures or data aberrations (e.g., disk drive failures or parity errors). Thus, hardware and/or data redundancy and various error correcting schemes are needed to ensure data integrity and availability. However, the use of a "brute-force" disk mirroring scheme or other similarly unsophisticated method is unacceptably expensive in a video-on-demand system, because the amount of data storage could easily extend into terabytes of data, currently out of the price range for many applications. Finally, many conventional analog and newer digital systems do not "scale up" well in terms of bandwidth. Therefore, there remains a need for providing reliable, high-bandwidth video data storage and retrieval at a low price. Conventional systems have not effectively addressed these needs.

SUMMARY OF THE INVENTION

The present invention solves the aforementioned problems by distributing digital data such as video data across a plurality of media servers in a special manner, retrieving the data at one or more clients across the network, and correcting data errors in the client computers to offload processing from the media servers. The invention contemplates allocating a required data bandwidth across a plurality of media servers to provide a guaranteed data stream bandwidth to each client which requests it at delivery time. The distributed nature of the system allows it to scale up easily and avoids single points of failure, such that continued operation is possible even in the face of a media server failure or a disk failure.

Generally, a networked system includes a plurality of media servers each having a plurality of disk drives over which one or more data files are distributed. The principles of the invention superimpose a hierarchical analysis on the available bandwidths in the system in order to optimally balance bandwidth across the system at data retrieval time. This efficient balancing of I/O bandwidth eliminates "overkill" in computing resources and I/O resources which would otherwise wastefully allocate resources when they are not truly needed.

The invention further provides a means of implementing Redundant Arrays of Inexpensive Disk (RAID) techniques to distribute data blocks across a plurality of media servers so that the loss of a server is recoverable. Additionally, the invention provides a "client-centric" approach to retrieving data and recovering missing data, so that clients can regulate their own data rates as long as they do not exceed allocated bandwidths.

Other features and advantages of the invention will become apparent through the following detailed description and the drawings.

DETAILED DESCRIPTION OF THE PREFERRED EMBODIMENTS

Figure 1:
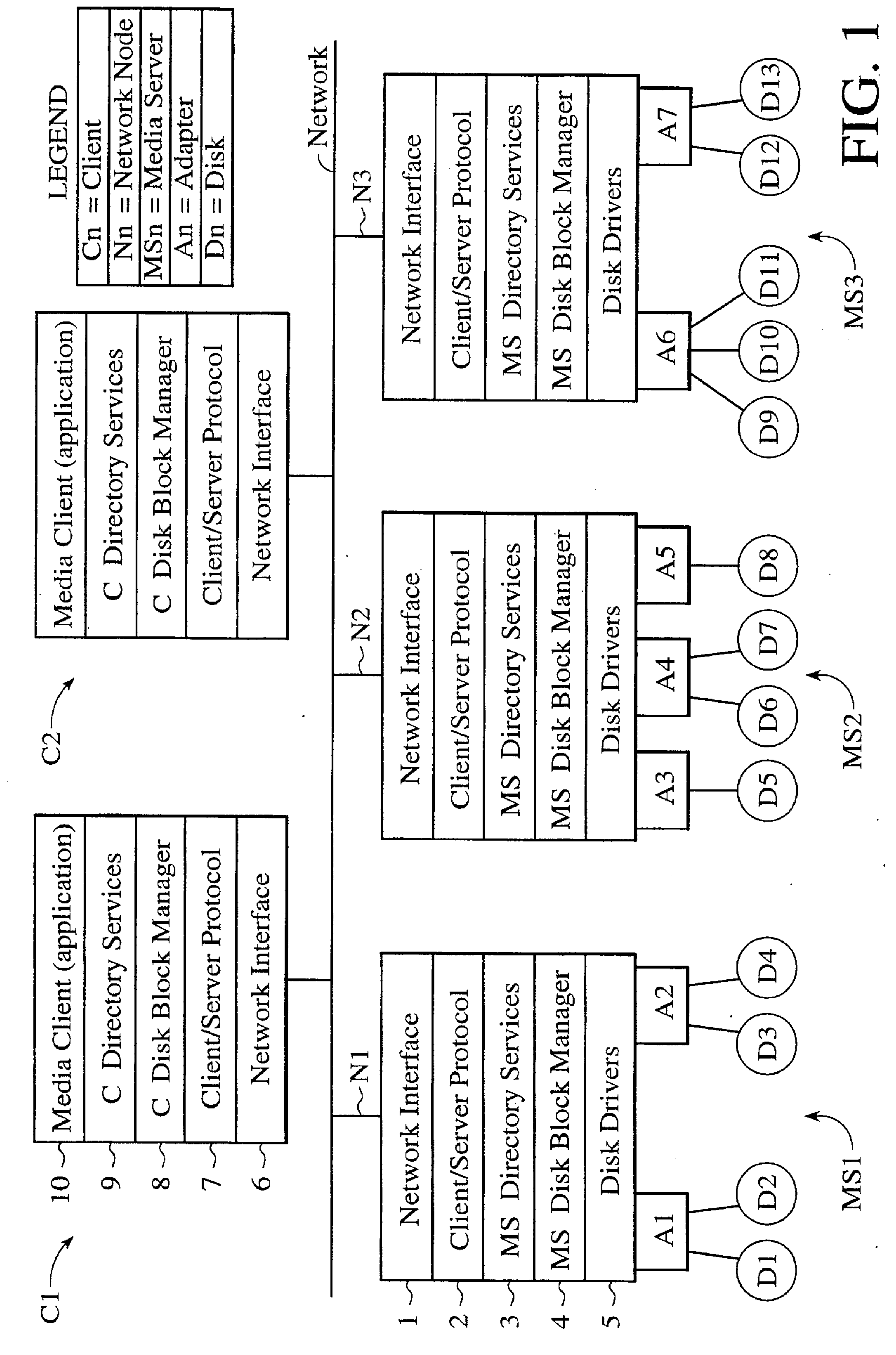
FIG. 1 shows a system configured to employ the principles of the present invention, including two media clients C1 and C2, and three media servers MS1, MS2 and MS3.

FIG. 1 shows a system employing the principles of the invention. In FIG. 1, media servers MS1, MS2, and MS3 each are coupled to a network, which may for example comprise an Ethernet™, Fiber Distributed Data Interchange (FDDI), Asynchronous Transfer Mode (ATM), a Small Computer System Interface (SCSI) or any other network used for transporting data among the media servers.

Using media server MS1 as an example, each media server is coupled to the network through a network interface 1 and a client/server protocol 2, which may comprise a standard ISO protocol such as TCP/IP. Each media server further comprises a media server directory services manager 3, a media server disk block manager 4, and one or more disk drivers 5 which handle interaction with local disks d1 through d4.

As can be seen in FIG. 1, media server MS1 includes four disks d1 through d4, coupled through two disk controllers a1 and a2, where each disk controller controls two disks. Each disk controller may comprise a Small Computer System Interface (SCSI) controller, which includes a data bus allowing data to be transferred from more than one disk. Similarly, media server MS2 includes four disks d5 through d8, coupled through three disk controllers a3 through a5 in a configuration different from that of media server MS1. Finally, media server MS3 includes five disks d9 through d13 coupled through two disk controllers a6 and a7 in yet a different configuration.

Media clients C1 and C2 are also coupled to the network as illustrated in FIG. 1, and generally "consume" (i.e., retrieve over a period of time) data which is stored on media servers MS1 to MS3. As described in more detail herein, each data file, such as a movie comprising video and audio data, is preferably distributed across a plurality of media servers in accordance with RAID (Redundant Arrays of Inexpensive Disks) principles in order to prevent reliance on any one media server. Therefore, when a media client requests video data, the "scattered" data file is retrieved from a plurality of media servers, reassembled into the correct sequence, and late or missing blocks are reconstructed using error-correcting codes as required.

Referring by way of example to media client C1, each media client may comprise a network interface 6 and client/server protocol 7 which collectively allow each client to communicate with other nodes on the network. Each media client may further comprise a client disk block manager 8, a client directory services manager 9, and a media client application 10 which actually "consumes" the data. Each of these components will be described in more detail subsequently herein. It should be noted that the functions of the client directory services 9 and the media server directory services 3 generally perform similar functions, as do the client disk block manager 8 and the media server disk block manager 4, as discussed in more detail herein.

Each media client application may request video data, decompress it, and present it on a television screen for viewing, such as to display a movie for a hotel guest. The system may also be used as a UNIX™ Network File System, and each media client could thus comprise a host computer using the file system. It is contemplated that many different media clients and different applications can be used.

Each media server and media client may comprise a CPU, data bus, memory, and other peripherals, such as various off-the-shelf Intel-based units widely available (e.g., Intel 486-based products). The specific devices selected are not important to practice the principles of the present invention.

1. System Bandwidth Availability

Viewing each media server MS1 through MS3 as a resource which may be used to supply data in the system, each media server is able to provide data from its associated disks at a sustained data rate which is dependent on a number of factors.

First, each media server generally comprises a CPU, memory, internal data bus, and one or more network interfaces across which all data must generally flow when retrieved from the disks and supplied to the network. Thus, each media server can be viewed as a node having a maximum data bandwidth which cannot be exceeded on a sustained basis. In other words, regardless of the number of disks and controllers within the media server, it has a maximum output data rate which cannot be exceeded. The bandwidth of each media server can be determined empirically by attempting to retrieve large quantities of data at a sustained rate using various I/O configurations. (It will be noted that configurations are possible in which the computer itself presents essentially no bottleneck, and the invention is not intended to be limited in this respect). Each node is indicated in FIG. 1 with the designation "N" followed by a number (e.g., N1 is a node corresponding to the data "pipe" through which media server MS1 can supply data).

Second, each media server may comprise one or more disk controllers, each of which typically has a maximum sustainable data rate at which it can provide data retrieved from all the disks it controls. For example, SCSI controllers have a typical maximum sustainable data rate of about 4 megabytes per second (4 MB/sec), regardless of how many disks are controlled by that SCSI controller. Although media server MS1 has two disk controllers a1 and a2, the bandwidth of the media server as a whole may be lower than the combined bandwidth of the two controllers, because the node itself may have a lower sustainable data rate than that of the combined controllers. Typically, each SCSI controller can control up to 7 disks, although the invention is not limited in this respect and any type of disk controller or other I/O device can be used. For the sake of clarity, a discussion of separate SCSI "chains" has been omitted, it being understood that an I/O hierarchy may exist within each controller.

Third, each disk controller may control one or more disks, each disk having a maximum sustainable data rate at which it can provide data in read or write operations. Thus, if disk d1 and d2 each can read data at a sustained rate of 3 MB/sec, the maximum data available from these combined disks would be 6 MB/sec. However, since SCSI controller al could only sustain 4 MB/sec, the total usable bandwidth from these disks collectively would be limited to 4 MB/sec. And if node N1 has a maximum sustainable data rate of 3.5 MB/sec due to its internal configuration, then the entire configuration of media server MS1 as shown would be limited to that rate. The remaining unused disk bandwidth would effectively be wasted if one were attempting to maximize bandwidth usage in the system.

The present invention contemplates the storage of data onto each disk in a fixed block size, preferably large (e.g., 32 kilobytes (KB) per block), to minimize the number of read and write operations which must occur in order to access large quantities of data. One of ordinary skill in the art will recognize that variable block sizes may be used, or fixed block sizes of larger or smaller increments may be used according to specific design objectives.

The selection of block size can impact the effective sustained data rate obtainable from a particular disk. For example, if a block size of 32 KB is used, a single read operation would result in 32 KB of data being transferred. This would probably result in a higher effective data rate than if a block size of 1 KB were used, because in order to retrieve 32 KB of data with a 1 KB block size, 32 read operations would need to be performed, and each read operation incurs overhead costs in addition to the normal data transfer costs.

The foregoing considerations, which are factored into how a computer system should be configured, can be advantageously used to determine where and how data blocks should be distributed in the system for a particular data file in order to optimize data access and guarantee isochronous data streams for applications such as video-on-demand.

The inventors of the present invention have discovered that using a data storage and retrieval scheme which takes into account the bandwidth characterizations in a system such as that shown in FIG. 1 results in substantial increases in efficiency which can significantly reduce the number of devices which must be assembled to provide the large data storage capacity needed for video on demand and other applications. Such a scheme can also guarantee consumers of the stored data that they will be able to store and retrieve data at a specified bandwidth at delivery time, thus ensuring that an isochronous data stream can be provided. This is particularly important in a video-on-demand system, because different multiple isochronous video streams must be provided in varying configurations as movies are started, stopped, fast forwarded, and the like over the network. Other features and advantages of the invention will become apparent with reference to the other figures and the following description.

Figure 2:
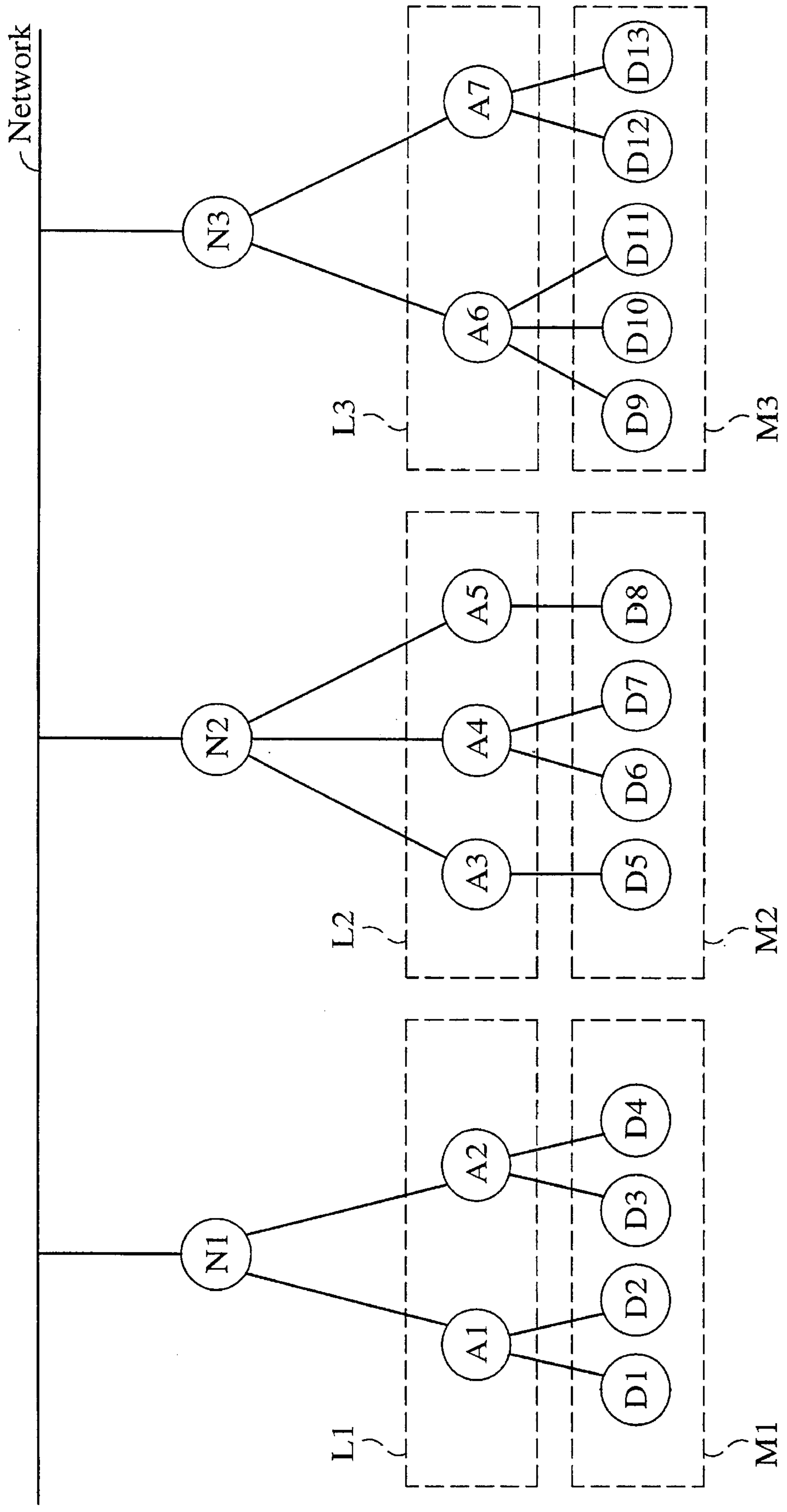
FIG. 2 shows how the I/O resources of the media servers in FIG. 1 may be viewed for purposes of determining bandwidth availability.

FIG. 2 shows how the computer I/O resources of media servers MS1 through MS3 in FIG. 1 can be viewed as a hierarchy of levels. For example, N1 in FIG. 2 corresponds to node N1 in FIG. 1. Below node N1 are two I/O levels, L1 and M1, corresponding to the disk controllers and disks, respectively, which are part of media server MS1. As can be seen in FIG. 2, disk controller a1 in level L1 controls two disks d1 and d2 which are in level M1. Similarly, disk controller a2 in level L1 controls disks d3 and d4 in level M1.

A similar hierarchy exists with respect to nodes N2 and N3 in FIG. 2. As discussed previously, the arrangement of these devices may be selected during system design in order to optimize data rates. For example, if each SCSI controller can support a sustained data rate of only 4 MB/sec, it would be wasteful to connect 7 disks each having a 2 MB/sec sustained rate to the one SCSI controller if one wanted to maximize available bandwidth. This is because the aggregate bandwidth available from 7 disks would be 14 MB/sec, but only 4 MB/sec could pass through each SCSI controller. Although the principles of the present invention generally seek to maximize bandwidths in the system (and would thus generally avoid such a configuration), other system designs may find such a configuration desirable because high sustained data rates may not be a primary objective in all designs.

It will be recognized that different types of disk controllers and disks may be combined in the system shown in FIG. 1. For example, a SCSI controller may control disks of varying capacities and speeds, and different types of controllers may co-exist in the same media server. Similarly, each media server may have a different CPU type or clock speed, different memory capacity, and the like. Therefore, the available bandwidths for retrieving data in the system may not be readily apparent.

Figure 3:
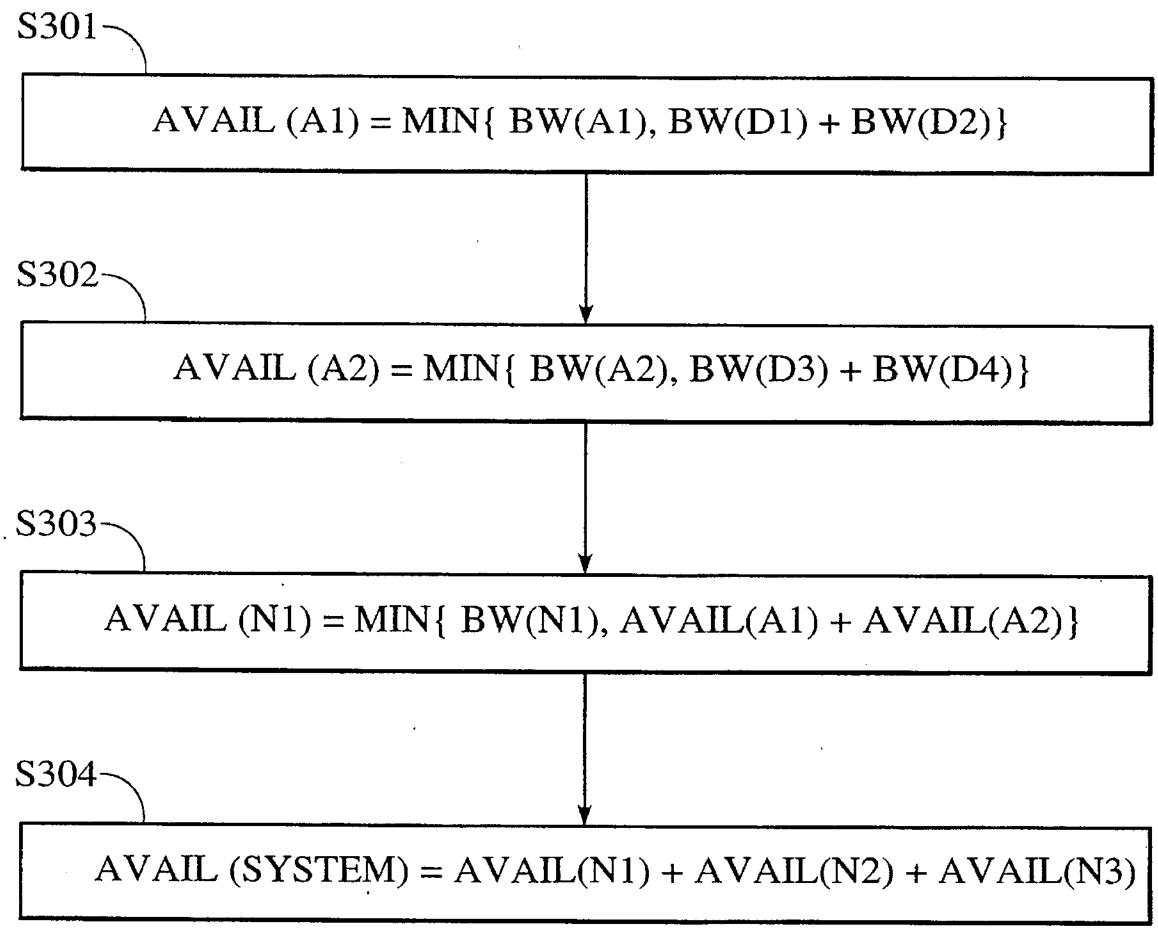
FIG. 3 shows steps for determining the bandwidth availability for each of the media servers in FIG. 1.

FIG. 3 shows how the available (i.e., "usable") data bandwidth for each media server in the system of FIG. 1 may be determined. The notation AVAIL(x) in FIG. 3 refers to the available bandwidth of x, where x is either a level in the hierarchy shown in FIG. 2 or one of the devices in such a hierarchy. Beginning at step S301 in FIG. 3, the available bandwidth of disk controller al is determined to be the MINIMUM of the bandwidth of the disk controller itself, and the sum of the bandwidths of the disks controlled by that controller. For example, if disk controller al is a SCSI controller having a maximum sustainable data rate of 4 MB/sec, and each disk controlled by that controller has a maximum sustainable data rate of 2.5 MB/sec (considering such factors as block size discussed previously), then the available bandwidth through controller a1 is 4 MB/sec, the available bandwidth being limited by the controller itself.

Similarly, in step S302, the available bandwidth of disk controller a2 is determined to be the MINIMUM of the bandwidth of the disk controller itself, and the sum of the bandwidths of the disks controlled by that controller. For example, if disk controller a2 is also a SCSI controller having a maximum sustainable data rate of 4 MB/sec, and each disk controlled by that controller has a maximum sustainable data rate of 1.5 MB/sec (again considering such factors as block size discussed previously), then the available bandwidth through controller a2 is 3 MB/sec, the disks themselves being the limiting factor.

In step S303, the available bandwidth of node N1 is determined by taking the MINIMUM of the bandwidth of the node itself, and the sum of the available bandwidths of disk controllers a1 and a2. For example, if the bandwidth of node N1 is empirically determined to be 12 MB/sec, then the available bandwidth of the node is 7 MB/sec, because the disk controllers (4 MB/sec and 3 MB/sec, respectively, as determined above) are the limiting factors. The available bandwidth of node N1 is thus the total bandwidth which can be supplied by media server MS1.

Finally, in step S304, the available bandwidth of the entire system (i.e., the combined available bandwidth from all the media servers) may be determined in step S304 by adding the available bandwidths of each of the nodes, where steps for determining the available bandwidths for nodes N2 and N3 are omitted for brevity. It is assumed in this case that the network itself does not limit the available bandwidth; Ethernet has an approximate bandwidth of 10 megabits/sec so its use is not realistic in the example presented above. However, FDDI data rates can approach 100 megabits/sec, and an FDDI network would therefore be more suitable for the example given.

2. RAID Data Storage Principles

The present invention contemplates storing data in the system in a manner which allows it to be quickly and reliably retrieved. One known technology which facilitates these objectives is RAID (Redundant Arrays of Inexpensive Disks). As can be seen in FIG. 1, systems constructed according to the invention may comprise a plurality of disks, which may be inexpensive small disks. Large data storage capacity can be achieved by "bunching" many disks onto each computer in a hierarchical manner through one or more disk controllers.

RAID technology generally includes many different schemes for replicating data and using error-correcting codes to achieve data reliability and increased data rates. A RAID system can be generally described as one that combines two or more physical disk drives into a single logical drive in order to achieve data redundancy. Briefly, the following "levels" of RAID technology have been developed:

level 0: Data striping without parity. This means that data is spread out over multiple disks for speed. Successive read operations can operate nearly in parallel over multiple disks, rather than issuing successive read operations to the same disk.

level 1: Mirrored disk array. For every data disk there is a redundant twin. Also includes duplexing, the use of dual intelligent controllers for additional speed and reliability.

level 2: Bit interleaves data across arrays of disks, and reads using only whole sectors.

level 3: Parallel disk array. Data striping with dedicated parity drives. Drives are synchronized for efficiency in large parallel data transfers.

level 4: Independent disk array. Reads and writes on independent drives in the array with dedicated parity drive using sector-level interleave.

level 5: Independent disk array. Reads and writes data and parity across all disks with no dedicated parity drive. Allows parallel transfers. Multiple controllers can be used for higher speed. Usually loses only the equivalent of one drive for redundancy. One example of this type of system which is available is the Radion LT by Micropolis, Inc.

The present invention preferably makes use of RAID level 5 principles, and implements "striping" and redundancy across entire media servers. That is, data and error-correcting code (ECC) blocks are spread across multiple media servers in order to access them quickly and to ensure continued operation in the event that one or more disks, controllers or media servers fails.

In one embodiment, the present invention contemplates generating ECC blocks as a function of the number of media servers across which a file is to be distributed. Thus, if a file is to be distributed across N servers, then the number of ECC blocks which may be generated and distributed across the N servers along with the file blocks is:

$$ECC\text{ blocks} = \frac{\text{number of file blocks}}{N-1}$$

For example, if a file comprises 3,000 blocks, and the file is to be distributed across 5 servers, then the number of ECC blocks would be 3,000/4.0=750. Other variations are of course possible, and one of ordinary skill in the art will recognize that many methods of creating ECC blocks are possible. It is also of course possible to store data without using ECC or parity blocks.

In various embodiments, each data block is stored on a single disk, but no single disk or media server is dedicated to ECC blocks. Instead, the ECC blocks are distributed across all of the media servers and disks such that each drive contains a mixture of data and ECC blocks. One advantage of this approach is that read and write requests can be carried out in parallel. Moreover, if an individual media server or disk fails, the data is protected and still remains available for access, although the available bandwidth may be reduced. Each media server may comprise a complete and separate file system. A lost media server can be "rebuilt" from the remaining media servers in the system based on the ECC blocks and data blocks from the other media servers.

Generally speaking, an ECC block can be formed by taking the "exclusive OR" (XOR) of two data blocks. Thus, suppose a file has data blocks numbered 1, 2, 3, 4, 5, and 6 in sequence, each corresponding to segments of a movie. Assuming that these data blocks are to be distributed across 3 servers, then 6/2=3 ECC blocks will be generated. Taking the XOR of blocks 1 and 2 would produce the first ECC block (ECC 1 ). The data represented by data blocks 1 and 2 is now stored in data blocks 1, 2, and ECC 1, each of which is preferably stored on a different media server. If data block 1 is lost, it can be recovered by performing an XOR operation between block 2 and the ECC block 1, which are each stored on the remaining media servers.

Similarly, ECC block 2 can be formed by taking the XOR of data blocks 3 and 4, and storing each of these (block 3, block 4, and ECC block 2) on different media servers. The loss of any one of these blocks can be recovered by taking an XOR of the remaining two blocks. This provides one approach for data recovery in the system.

It is not necessary that all files in the system are stored using ECC blocks. Moreover, files having ECC blocks can be stored in the same system as those without ECC blocks (i.e., ECC blocks can be treated as just another data block for a file, subject to a recognition that the data retrieval mechanism must distinguish between file types).

In addition to storing data across multiple servers in a RAID level 5 manner, each media server can be implemented with RAID disks itself. That is, if RAID disks are used in each media server, then individual disks can fail without causing the loss of the data allocated to that media server.

Various techniques have been developed to stripe data across multiple disks to reap the above described benefits. One representative example is disclosed in U.S. Pat. No. 5,166,939 (Jaffe et al.), incorporated herein by reference. A further discussion is included in an article entitled, *Disk Arrays: High-Performance, High-Reliability Storage Subsystems*, by Gregory Ganger et al., IEEE Computer (1994), also incorporated herein by reference.

3. Disk Block Allocation Scheme

The disk block allocation method of the present invention generally attempts to balance the storage of data blocks across the disks and media servers in the system in proportion to their available bandwidth. When blocks are thereafter retrieved in sequence, the bandwidth load on each device will thus be proportionally balanced in the system.

Figure 4A:
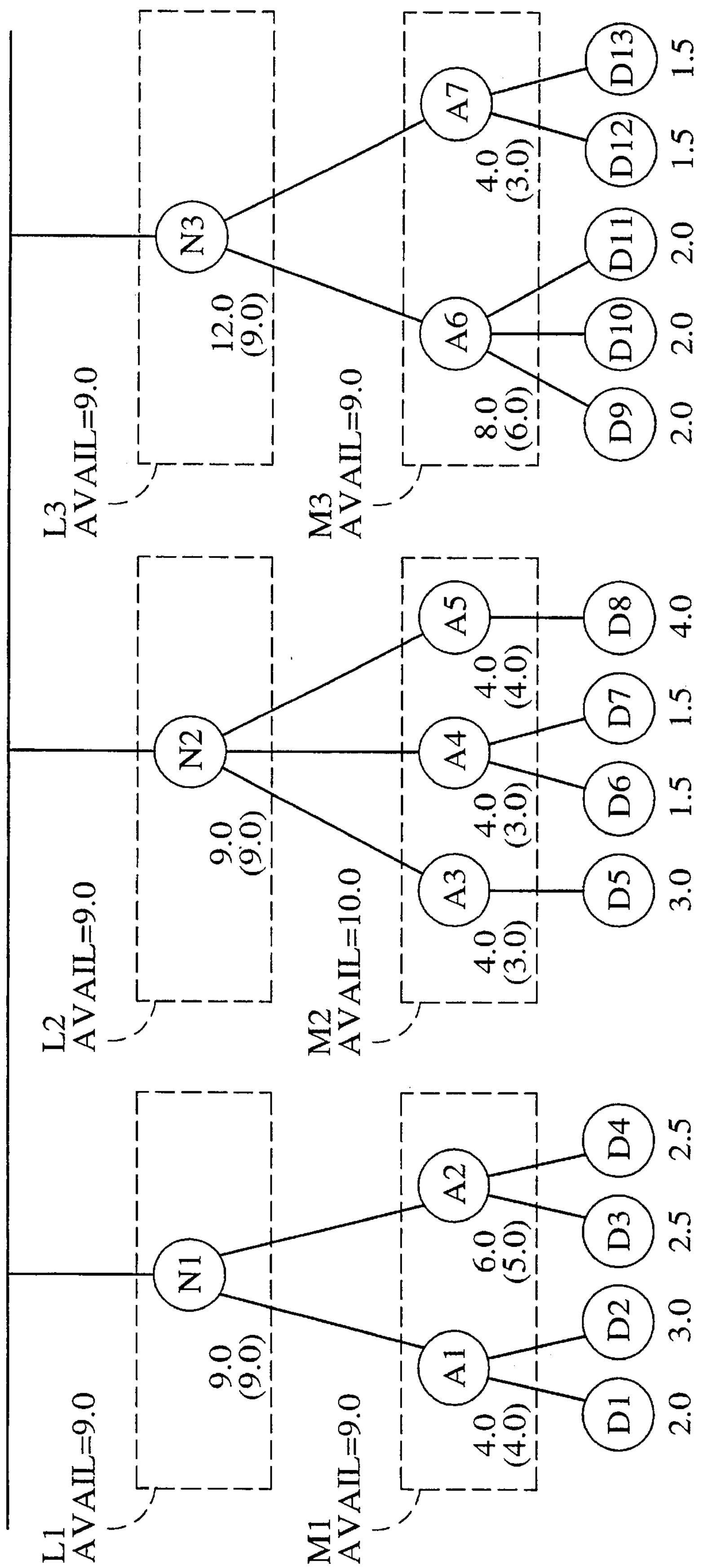
FIG. 4A shows an illustrative example of determining the bandwidth availabilities for the configuration of FIG. 2, where each media server has the same availability.

A simplified illustrative example of allocating data blocks to each hierarchical device in the system depicted in FIG. 1 will now be described. FIG. 4A shows the same server I/O hierarchy as that of FIG. 2, with numbers next to each node, disk controller, and disk representing the maximum sustained data rate which that device can provide. For example, nodes N1 and N2 (each including a CPU, memory, internal buses, and the like) can each provide a sustained data rate of 9.0 MB/sec, while node N3 can provide a sustained rate of 12.0 MB/sec. The numbers in parentheses below each data rate represent the availability of this rate, as determined by the method discussed below.

Disk controllers a1, a3 through a5, and a7 can each provide a sustained data rate of 4.0 MB/sec as illustrated in FIG. 4A. Also as shown in FIG. 4A, disk controller a2 can provide a sustained rate of 6.0 MB/sec, and disk controller a6 can provide a sustained rate of 8.0 MB/sec.

It will be appreciated that although disk controllers are shown, this is by way of example and other types of I/O devices could instead be used. It will also be appreciated that this hierarchical decomposition of I/O subsystems can be replicated within the various devices. For example, each disk controller, such as SCSI controllers, can also include multiple "chains" to which each disk can be connected, thus further imposing limitations within each disk controller.

Each disk in the configuration can provide sustained data rates as illustrated by the numbers below each disk in FIG. 4A. Again, the data rate sustainable by a particular disk may be a function not only of the hardware device itself, but also of the block size selected for reading and writing data to that device.

Assuming that a video data file of 1.0 gigabytes (GB) is to be stored in this system across all three media servers MS1 through MS3, the bandwidth allocations to each device in the system must be determined. The bandwidth allocations for a given configuration can be determined once, at the time the system is configured, and this information stored in various locations for use when a file is to be stored. That is, the following steps need not be carried out every time a file is to be stored.

To determine the bandwidth availability of media server MS1, the bandwidth availability of each disk controller must first be determined. Using the steps shown in FIG. 3, it is first determined in step S301 that the bandwidth availability of disk controller al is 4.0 MB/sec, indicated in parenthesis in FIG. 4A below the controller's bandwidth. For disk controller a1, the disk controller itself is the limiting factor; although disks d1 and d2 could support a total of 5.0 MB/sec, no more than 4.0 MB/sec can pass through controller al. Similarly, in step S302 the bandwidth availability of disk controller a2 is determined to be 5.0 MB/sec, limited by the sum of disks d3 and d4. Thus, the number 5.0 is indicated in parenthesis below the bandwidth of controller a2 in FIG. 4A.

Given that the bandwidth availability of controller a1 is 4.0 and that of controller a2 is 5.0 (level M1), the total availability for the controllers is 9.0, indicated next to the dotted line box surrounding the controllers. Thus, media server MS1 cannot supply more than this sustained data rate. Coincidentally, for the configuration shown in FIG. 4A, the bandwidth sustainable by node N1 itself is also 9.0 MB/sec, which represents limitations such as the internal computer bus bandwidth, CPU speed, and the like. Therefore, as determined in step S303, the total bandwidth availability for node N1 is 9.0 MB/sec, limited equally by the node's data rate and the combined data rate of its controllers. This is the availability of media server MS1.

Moving to media server MS2 (node N2 in FIG. 4A), the availability of disk controllers a3 through a5 must first be determined. Controller a3 has an availability of 3.0 MB/sec, limited by the data rate of its single disk d5. Controller a4 has an availability of 3.0, limited also by the sum of the data rates of its two disks d6 and d7. Controller a5 has a data rate of 4.0 MB/sec, equally limited by the controller's data rate and the disk d8 which it controls. Therefore, the total available bandwidth of the combined controllers a3 through a5 (level M2) is 10.0 MB/sec. However, node N2 has an inherent limitation of 9.0 MB/sec, like that of node N1, and therefore the entire node availability is limited to 9.0 MB/sec. This is the availability of media server MS2.

Finally, the availability of media server MS3 is determined to be 9.0 MB/sec, limited by the availability of controllers a6 and a7. Note that for the configuration shown in FIG. 4A, node N3 could itself support up to 12.0 MB/sec if not for the limitations of the disk controllers a6 and a7.

In view of the above, each media server has an equal availability of 9.0 MB/sec, and the aggregate availability of the "team" of these three servers is thus 27.0 MB/sec. This is indicated as step S304 in FIG. 3.

An example will now be given for illustrating how a file can be distributed in the system in accordance with the principles of the invention. The follow explanation uses round numbers for exemplary purposes only. One of ordinary skill in the art will recognize that most memory allocation units, such as disk block size and the like, are selected in base two increments. Thus, although the example refers to a 32,000 byte block, it is of course more practical to use an actual size of 32,768 bytes, which is an even power of 2.

Suppose that a 1.0 GB file is to be distributed across these three media servers MS1 to MS3 using a block size of 32,000 bytes (even). This means that a total of 31,250 data blocks will be needed (32,000×31,250=1.0 GB). However, if ECC blocks are to be (optionally) used, then the number of blocks for each server will be 31,250/(N−1)=15,625 blocks. The number N−1 is used in the denominator to account for the extra ECC blocks which will be generated for the servers. Thus, each of media servers MS1, MS2 and MS3 will be allocated 15,625 blocks.

In conjunction with FIG. 4A, reference will now be made to FIG. 5, which shows steps which can be used to allocate the data file blocks to media servers and their I/O devices in accordance with various principles of the invention.

In step S501, the data file blocks are allocated to each of the three media servers according to the bandwidth availability of that media server. For the example in FIG. 4A, each media server has an identical bandwidth availability of 9.0 MB/sec, and thus each server is allocated an equal number of blocks (15,625). It is generally contemplated that the allocation of blocks among media servers is performed by client disk block manager 8 in conjunction with client directory services 9 as depicted in FIG. 1. However, once a client has allocated disk blocks to a particular media server, then the media server directory services 3 and media server disk block manager 4 (see FIG. 1) on that media server handle the allocation of the file blocks within that media server. That is, each media server determines, based on its known configuration, where to place each block within the media server's I/O subsystem.

Figure 5:
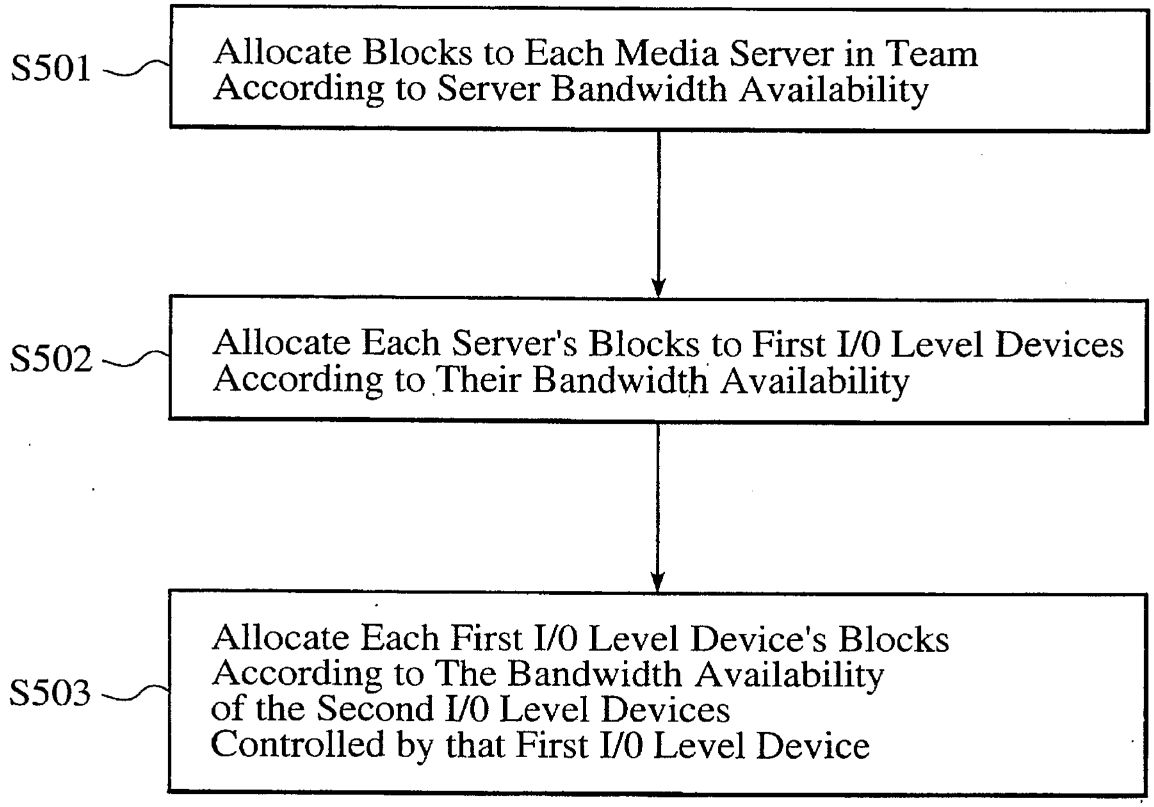
FIG. 5 shows how file data blocks may be allocated among media servers, first-level I/O devices, and second-level I/O devices in the system.

Next, in step S502 of FIG. 5, the blocks in each media server may be allocated in proportion to the bandwidth availability of each first-level I/O device, in order to balance the bandwidth load upon data retrieval. For the configuration shown in FIG. 4A, the first-level I/O devices am the disk controllers a1 and a2. Beginning with disk controllers a1 and a2, although the availability of the controllers as a group is 9.0 MB/sec, each controller has a different bandwidth availability. Controller al has an availability of 4.0 MB/sec, while controller a2 has an availability of 5.0 MB/sec. Therefore, the 15,625 file data blocks allocated to media server MS1 will be further allocated between these two controllers according to their bandwidth availability as follows:

controller a1 will get $4/9$ of the 15,625 blocks=6,944 blocks
controller a2 will get $5/9$ of the 15,625 blocks=8,681 blocks It will be appreciated that the above allocation can be rounded up or down without significantly departing from the principles of the invention; therefore, an approximation may be used instead of precise allocations.

Finally, at step S503, the blocks which have been allocated to each first-level I/O device (disk controllers a1 and a2 in FIG. 4A) are further allocated to each disk controlled by that controller in accordance with the bandwidth availabilities (i.e., data rates) of each disk in proportion to the ratio of that disk's availability to the total availability of the disks supplying that controller. Thus, the blocks allocated to each controller will be further allocated to each disk in media server MS1 as follows:

disk d1 gets $2/5$ of the 6,944 blocks=2,777 blocks (from controller a1)

disk d2 gets $3/5$ of the 6,944 blocks=4,167 blocks (from controller a1)

disk d3 gets half of the 8,681 blocks=4,341 blocks (from controller a2)

disk d4 gets half of the 8,681 blocks=4,341 blocks (from controller a2).

The disk blocks allocated as explained above may be distributed in a "round-robin" fashion across the media servers, controllers and disks. For example, assuming that block 1 is a data block, block 2 is a data block, and block 3 is an ECC block for correcting blocks 1 and 2, then block 1 could be stored on media server MS1, block 2 stored on media server MS2, and block 3 stored on media server MS3, and so on, with the further limitation that the number of blocks allocated to each device are as described above.

Within each media server, a "history" can be kept as to how many of the blocks arriving at the media server for storage were allocated to each controller and to each disk. As blocks arrive, this "history" may be consulted to determine where the next arriving block should be allocated. For example, in FIG. 4A, it can be seen that out of every 9 blocks arriving for storage in media server MS1, 4 will be allocated to controller a1, and 5 will be allocated to controller a2. Within controller a 1, out of every 5 blocks arriving at the controller, 2 will be allocated to disk d1, and 3 will be allocated to disk d2. This hierarchical "balancing" of disk blocks based on bandwidth provides important benefits, as described previously.

Many variations on the scheme of selecting a media server, controller or disk for each individual block are possible. Of course, the final resting place of each block (i.e., the media server on which each block is stored) must be known by the directory services component of each client, so that the data can be later retrieved. Similarly, each media server must know how the blocks are distributed within its own I/O subsystem. As a simple example, given a file of N blocks, the blocks can be numbered as 0, 1, 2, . . . N−1. For a set of C controllers in a media server, assuming the files are allocated evenly across all of the controllers of a single file server in a round robin fashion, beginning at some starting point S, then the controller which contains block number b of a file can be determined as:

$$controller=(b+S)/C$$

A primary objective of the above-described scheme is to cause data to be stored in each media server in a manner which balances the anticipated load when the data is retrieved in a sequential manner. Thus, for example, if disk d2 can support a higher effective data rate for reading data than disk d1, then more read operations should be directed to disk d2 at retrieval time in order to prevent "under-use" of that disk compared to the slower disks. The same principle applies to the disk controllers (or other first-level I/O devices) in each media server.

It will be understood that although a proportional scheme may be used for allocating disk blocks, it is also of course possible to use a lowest common denominator scheme among the I/O devices. For example, in FIG. 4A, instead of allocating blocks among controllers al and a2 according to their individual availabilities, the lower figure of 4.0 MB/sec could be used for both controllers, although this approach would of course use the resources less efficiently. The same principle applies to allocation across individual disks.

Figure 4B:
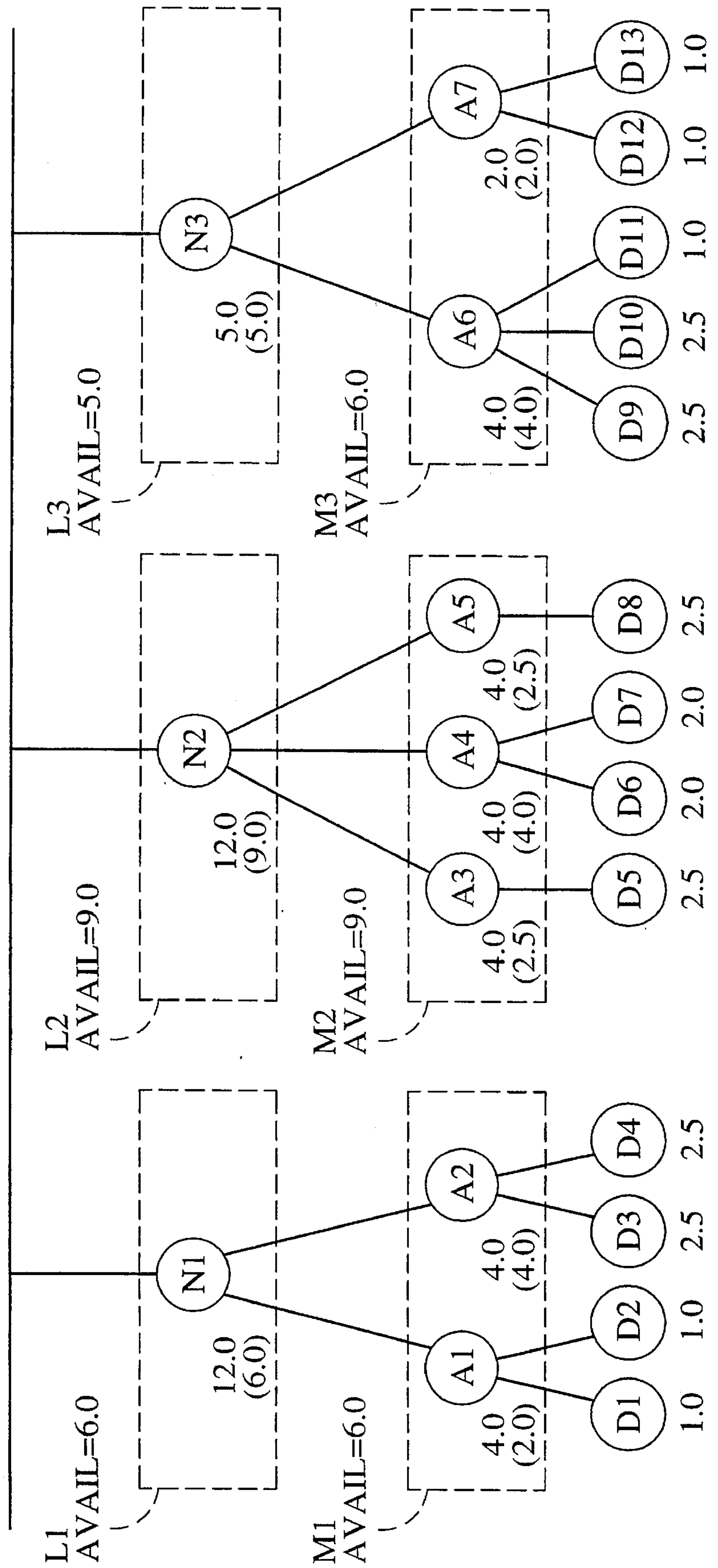
FIG. 4B shows a further illustrative example of determining the bandwidth availabilities for the configuration of FIG. 2, where each media server has a different bandwidth availability.

With reference to FIG. 4B, a more complex example of allocating data blocks to each hierarchical device in the system depicted in FIG. 1 will now be provided. FIG. 4B shows the same I/O hierarchy as that of FIG. 4A, but the availability of each node is different. Thus, for example, the availability of node N1 is 6.0 MB/sec, that of node N2 is 9.0 MB/sec, and that of node N3 is 5.0 MB/sec. It will also be noted that the disk controllers and disks in FIG. 4B, while following the same configuration as in FIG. 4A, provide different data rates from those in FIG. 4A. For example, controller al in FIG. 4B has an availability bandwidth of only 2.0 MB/sec, due to the use of slower disks d1 and d2. The aggregate bandwidth provided by the "team" of three servers in FIG. 4B is 20.0 MB/sec (6.0+9.0+5.0).

Again applying the principles shown in FIG. 5, a data file of 1.0 GB can be split up into data blocks each having a size of 32,000 bytes, and the blocks allocated among a "team" comprising the three media servers MS1, MS2, and MS3. To simplify the analysis of FIG. 4B, it will be assumed that no ECC blocks will be generated. Therefore, a total of 31,250 blocks need to be allocated among the servers. However, instead of equally distributing the blocks, the blocks will be allocated according to the ratio of bandwidth availability of each server to the total availability of 20 MB for the "team" of servers. Thus, the number of blocks for each media server will be:

node N1: $6/20$×31,250 blocks=9,375 blocks
node N2: $9/20$×31,250 blocks=14,963 blocks
node N3: $5/20$×31,250 blocks=6,912 blocks.

Once the client directory services 9 and client disk block manager 8 (FIG. 1) have performed the above allocation of blocks across each media server, then the principles of FIG. 5 may again be referenced to perform the lower-level allocation of these blocks within each media server as described previously.

Again, a primary advantage of this method of distributing disk blocks in the system is that when a sustained data stream of sequential blocks is read from all the media servers in the system, the bandwidth load on each media server (and, on each server's I/O subsystems) will be approximately balanced, and no single device or subsystem will be taxed out of proportion to the others. This allows a much more efficient use of existing resources, and it also allows a guaranteed allocation of bandwidths to be provided upon data retrieval, as discussed below.

A secondary benefit of the above allocation of disk blocks is that additional devices may be added to the system easily to incrementally increase bandwidth and/or storage capacity while maintaining the above balance. For example, if an additional disk with a sustainable data rate of 1.0 MB/sec were added to each of the controllers in FIG. 4A, then a simple redetermination of the bandwidth allocations in the system could be made, and files previously written to the existing disks could be re-written to the (larger) set of disks, thus balancing the bandwidth load across the entire available devices. This provides important scaling benefits.

Furthermore, any new files written would be written to the newly balanced configuration. As technology improves, faster devices can also be added to the configuration without departing from the original scheme; a new bandwidth allocation can be determined simply on the basis of numbers which have changed. The original balance in the system can thus be retained.

Although almost any operating system such as DOS may be used, the present inventors have found improved results if using DOS by developing disk drivers to be "non-blocking" to avoid bottlenecks where possible. Most DOS disk drivers "block" the calling application program until the disk operation is completed; this inefficiency can be removed by using a non-blocking disk driver. One approach is to have the driver accept disk requests, queue them up, and release the calling application; the application program can then check later to ensure that all the requests were successfully executed. The drivers can be interrupt-driven. Two reporting levels can be used: one level to check immediately whether the disk request has been properly formulated, and a second level to indicate the final status of the disk operation. Other approaches are of course possible; the use of a multi-tasking operating system with asynchronous disk drivers is also possible. A real-time operating system can provide optimum results.

Figure 6:
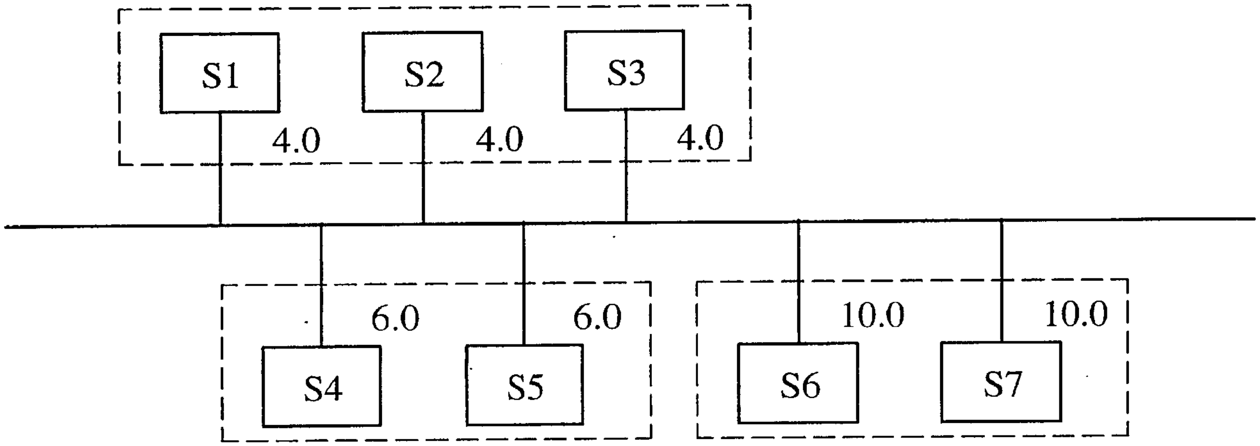
FIG. 6 shows how media servers may be grouped into teams each having a "total available" and a "currently allocated" bandwidth.

FIG. 6 shows how multiple media servers in a system may be configured into different "teams." In various embodiments, it may be preferable to group media servers having the same available bandwidth into the same team. Thus, for the example shown in FIG. 6, each of the media servers S1, S2 and S3 in team 1 has an availability of 4.0 MB/sec, and the total availability for that team is 12.0 MB/sec. Similarly, team 2 has the same total availability of 12.0 MB/sec, but only two media servers are included in this team. Finally, team 3 includes two media servers which collectively provide a total availability of 20 MB/sec. At the time a file is stored, a decision can be made regarding which team should be used to store the file, possibly anticipating those files which will require a higher retrieval rate.

As shown in FIG. 6, each team of media servers preferably has associated therewith not only a total available bandwidth, but also a "currently allocated" portion of this total available bandwidth. That is, as requests are made to use portions of the available bandwidth associated with each team, a record is kept of how much bandwidth has been actually allocated to clients for that team. In this manner, the system can be guaranteed to deliver the requested bandwidth to clients without exceeding the limits of the system. By the same principle, use can effectively be made of all of the available bandwidth for a particular configuration, thus avoiding wasteful use of resources in the system. This guaranteed allocation of bandwidth will now be described.

4. Guaranteed Bandwidth Allocation and Data Retrieval Principles

Once bandwidth availabilities for a given configuration have been determined and one or more teams of media servers have been defined, data can be retrieved (or stored) in accordance with a guaranteed bandwidth. In other words, guarantees can be made to particular clients in the system that bandwidth "promises" made to that particular client will be met. This is an important requirement for applications such as video-on-demand, because the inability to guarantee that a data stream can be reliably provided in a time-guaranteed manner could result in an unacceptable loss of picture integrity or other problems. As an added benefit, the bandwidth allocation scheme described herein ensures that all clients can make substantially full use of all available bandwidth in the system without waste.

At the time a file is stored in distributed blocks according to the principles described above, various "housekeeping" information may preferably be stored on each media server which indicates, for that file, which team of media servers the file was stored in (and thus how many media servers the file has been distributed over), how the data blocks are distributed among media the servers in that team, and so forth. This housekeeping information is preferably replicated on all media servers so that a media client can refer to any media server for this information.

As shown in FIG. 6, the total available bandwidths for each team of media servers is also known in the system. Therefore, each client can determine where the file is stored, how it is stored, and whether the system configuration can retrieve the file at a particular bandwidth requested by the client.

Figure 7:
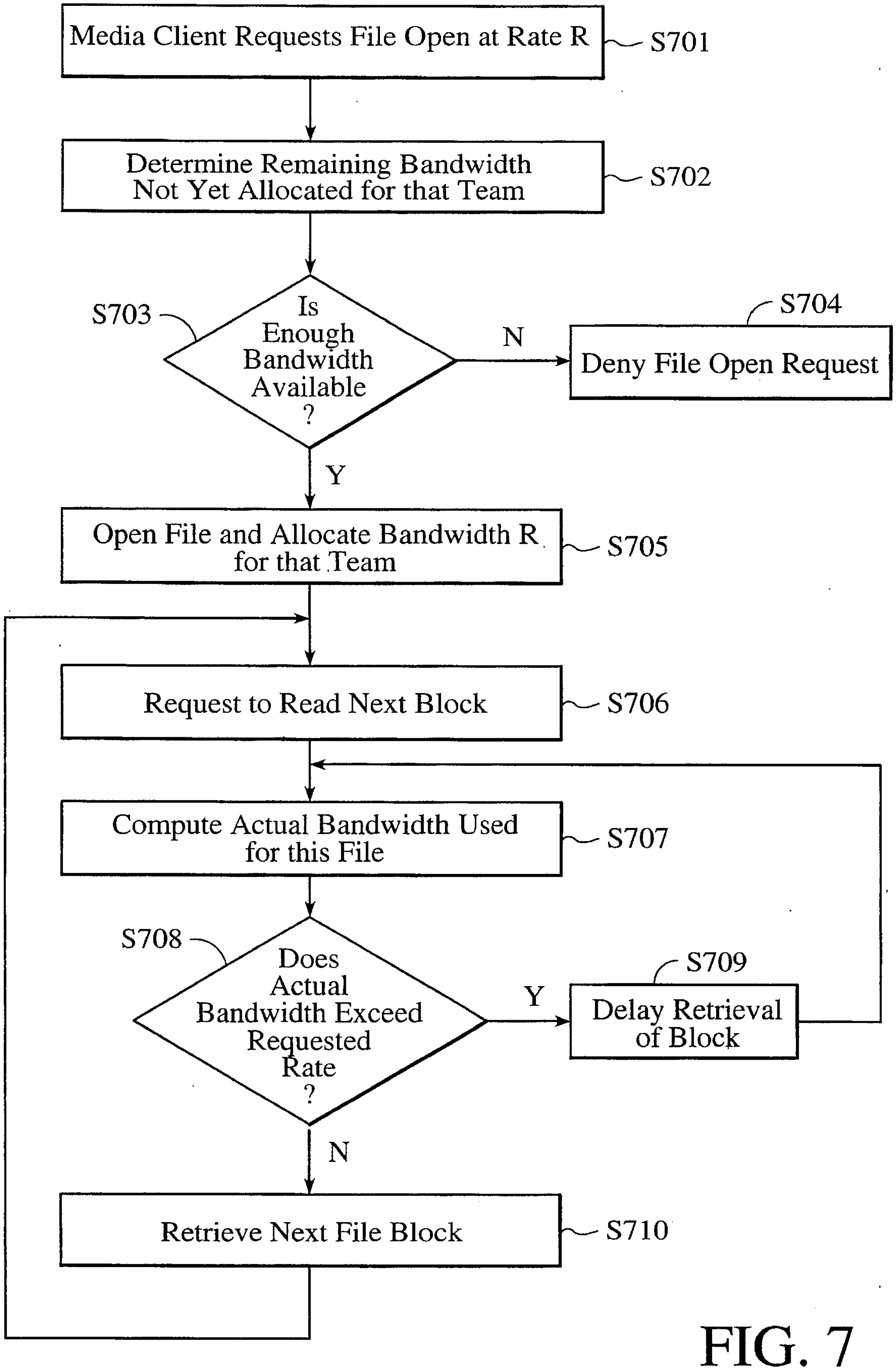
FIG. 7 shows various steps which may be performed in order to regulate bandwidths actually used by clients which have requested them.

FIG. 7 describes in flow chart form how data can be retrieved (or stored) in accordance with the guaranteed bandwidth principles of the invention. These steps may preferably be implemented be media client directory services 9 and media client disk block manager 8 (see FIG. 1). Beginning with step S701, a media client application, such as a movie display program, requests that a particular data file be opened at a particular data rate R, which indicates the sustained rate at which the file will be retrieved by the client. For example, if an MPEG compressed video file is stored across a team of servers, a client may need to read it back at a guaranteed continuous rate of 200 KB/sec in order to decompress and consume the data to show a movie stored in the file. Another client may need to retrieve the same file at a higher data rate for fast-forward purposes and the like, and yet another client may have a much lower bandwidth requirement for storing a file.

The bandwidth specification at the time a file is opened may be explicit or implicit. For example, MPEG compressed video files may have associated therewith a file attribute which indicates the normal data rate at which the file is to be retrieved in order to display a continuous movie image with audio.

Referring again to FIG. 7, after a client has requested that a particular file be opened with a guaranteed bandwidth, in step S702 a determination is made as to whether the team of media servers over which the requested file is stored has unallocated (remaining) bandwidth which is sufficient to cover the requested file retrieval rate. That is, each team of media servers is associated not only with a total available bandwidth, but a record is kept indicating how much of the available bandwidth for that team has actually been allocated to other clients in the system. Thus, for example, in FIG. 6 team 1 is shown as having a total available bandwidth of 12 MB/sec, but 8 MB/sec has already been allocated to clients in the system. Therefore, requests totalling an additional 4 MB/sec could be supported before team 1 would be fully utilized. The determination in step S702 may be performed by client directory services 9 (see FIG. 1).

At step S703, a determination is made as to whether enough bandwidth is available for the file request, based on the team on which the file is stored. (Similarly, a client may make a request to store a file at a particular bandwidth across a particular team of media servers, using the same principles). If not enough bandwidth is available for that team of servers, then in step S704 the file open request is denied. However, if enough bandwidth is available, then step S705 is executed.

In step S705, the requested file is opened, and the amount of bandwidth requested for that file is allocated as "in use" for that team. That is, a record is modified adding the requested bandwidth R to that team (see FIG. 6).

In step S706, the client makes a request to read (or write) the next (or first) data block of the file. In various embodiments, the present invention contemplates a "pull" model of data retrieval, in that each client requests data one block at a time, rather than having each media server provide data automatically or "pushing" it at the clients. In this manner, each client can effectively regulate its own conduct, as long as the client's requested bandwidth is not exceeded.

It should be noted that each client may be a process running on any CPU, and need not be limited to executing on a CPU different from that of the media server. Although such a "combined" configuration could have potential drawbacks, it is of course possible to have a media client and media server executing on the same machine.

In step S707, the media client (preferably in the client disk block manager 8 shown in FIG. 1) computes the actual bandwidth used so far for the file which is being read (written). This computation can be made in any number of ways; one way is simply to divide the total number of blocks requested over a particular time period with the length of the time period, such as a moving window of the last few seconds of time. It will also be appreciated that this determination need not be made in the client, although offloading it onto the client can increase performance of the media servers.

In step S708, a determination is made (again preferably in the media client, rather than the media server) as to whether the actual bandwidth currently being used by the client exceeds the rate requested by the client for that file at the time it was opened. If so, then in step S709 the next block retrieval (or block write) is delayed for a period of time to "slow down" the request rate from the client. This process repeats in a loop until it is determined in step S708 that the actual bandwidth used is less than or equal to the bandwidth requested at the time the file was opened. If the actually used bandwidth does not exceed the requested rate, then in step S710 the next file block is retrieved (written) from the appropriate media server in the team (each client directory services component, element 9 in FIG. 1, preferably knows which media server each block of the file is stored in).

The process repeats at step S706 for as long as the client application requests data. Each client re-orders the incoming blocks from the various servers, supplies missing blocks where necessary using ECC blocks if desired, and decompresses data if it was compressed. The latter steps may be performed in any of various ways and can depend on the particular media application. It will be recognized that more than one outstanding file request at a time may be pending. When a file is closed by a client, then the bandwidth which was allocated for the file opened by that client is released for use by other clients in the system. In the event that a client fails, a time-out can be provided to automatically reclaim a bandwidth allocation made by the failed client.

Different classes of file operations can have associated therewith default parameters for storing and retrieving data in the system. For example, a "data-archive" type of file write open can be provided as a utility in the client directory services which automatically opens a file on the next available server at a default slow required bandwidth. Similarly, a "file-transfer" type of utility can be provided which reads a file from one team of servers and writes it to a new team of servers. Thus, for example, if new disk drives are added to the system, files can be moved around the system and rewritten across more or fewer media servers, controllers, and/or disks. This offers the maximum flexibility in determining how data is distributed throughout the system.

It should be noted that various embodiments of the present invention contemplate a "client-centric" model of data storage and retrieval. In other words, rather than loading functions such as block ordering, error correction, and decompression on each media server, functions such as these are preferably performed in each client. Each media server preferably serves media clients by reading and writing file blocks as requested by the media clients. Moreover, each client "pulls" data from the servers at its own desired rate, instead of each server "pushing" the data to the clients with a single request. This allows media applications to regulate their own data rates as long as they do not exceed the bandwidth requested from the system. Of course, it is a simple matter to devise a loop which retrieves data from a media server team at the fastest possible rate and supplies it to a client which does not have a mechanism for retrieving a file one block at a time. It is generally up to the particular application as to how the retrieved data is used (i.e., for viewing a movie, etc.).

As described above, it is generally contemplated that each client would handle the recovery of missing blocks. For example, if media server MS2 becomes defective and thus no blocks can be retrieved from it, the requesting client would detect this condition and reconstruct the missing blocks through the use of the ECC blocks stored on the other media servers. These features can be provided by client disk block manager 8 (see FIG. 1 ).

Finally, a billing feature can be provided to "meter" actual bandwidth usage by clients. For example, step S707 in FIG. 7 may further comprise incrementing a billing counter for the particular application which is using the requested bandwidth. In this manner, client applications can later be billed for the bandwidth actually used in the system. One of ordinary skill in the art will recognize that there are numerous ways of implementing such a billing feature based on the actually measured bandwidth. This feature may be implemented in media client disk block manager 8 (see FIG. 1).

5. Software Architecture of Media Servers and Clients

Referring again to the software architecture of each media client and media server shown in FIG. 1, the following summarizes one possible embodiment for the functions and features which have been described.

Media server MS1 includes network interface 1 and client/sever protocol 2, which collectively allow each media server to communicate with other nodes on the network using a protocol such as TCP/IP. Media server directory services 3 handles, in conjunction with media services block manager 4, the allocation of blocks within the media server in accordance with the principles previously described. Additionally, media server services directory services 3 may provide other functions normally provided by file systems, such as a file system check which examines and guarantees file system integrity at boot time. A function may also be provided to rebuild data which was lost due to a disk failure, based on remaining data blocks and ECC blocks. Finally, additional layers can be added to provide a Network File System (NFS) type interface, or Andrew File System (AFS) type interface, so that clients which use these file systems can operate with the present invention without modification.

Disk drivers 5 may comprise any disk drivers which are compatible with the type of I/O devices used in the media server. Generally, non-blocking disk drivers are preferable to the standard DOS drivers, which "block" the running application. If a multitasking operating system is used, then these can be asynchronous drivers.

Each media client such as C1 includes a network interface 6 and client/server protocol 7, which form the counterpart to network interface 1 and client/server protocol 2 on each media server. It should be recognized that each media server can be configured with more than a single network interface in order to improve performance. Client disk block manager 8 and client directory services 9 collectively determine how a file should be allocated among a team of media servers, based on criteria outlined previously. Additionally, client directory services 9 may preferably hide the details of the distributed physical file system from media client applications. Finally, client directory services 9 may also include utilities which provide functions to transfer files, archive files, and open files at the requested bandwidths.

Thus has been described a method and apparatus for storing and retrieving data files in a system having a plurality of computers and I/O devices. The above description and accompanying drawings provide various preferred embodiments of the present invention. It will be understood by one of ordinary skill in the art that specific references to components herein are by way of example only, the specific devices and device values being dictated by the particular requirements and engineering tradeoffs involved in a particular implementation. It will be apparent that many modifications and variations of the present invention are possible in light of the above teachings. It is, therefore, to be understood that within the scope of the appended claims the invention may be practiced otherwise than as specifically described.

We claim:

1. A method of storing a data file across a plurality of media servers in a network, each media server having a plurality of first-level I/O devices and a plurality of second-level I/O devices, each second-level I/O device being controlled by one of the first-level I/O devices, the method comprising the steps of:

(a) dividing the data file into a plurality of data blocks;

(b) allocating the plurality of data blocks across each of the plurality of media servers;

(c) allocating each of the data blocks allocated to each media server in step (b) to first-level I/O devices in that media server according to the bandwidth availability of the first-level I/O devices in that media server;

(d) allocating each of the data blocks allocated to each first-level I/O device in step (c) to second-level I/O devices controlled by that first-level I/O device in accordance with the bandwidth availability of the second-level I/O devices; and (e) storing each of the data blocks onto the second-level I/O devices in accordance with the allocation made in step (d).

2. The method of claim 1, wherein step (c) comprises the step of using disk controllers as the first-level I/O devices, and wherein steps (d) and (e) each comprise the step of using disks as the second-level I/O devices.

3. The method of claim 1, wherein step (a) comprises the step of generating a plurality of error-correcting code (ECC) blocks for correcting errors in the plurality of data blocks, and wherein steps (b) through (e) collectively comprise the step of allocating and storing the plurality of ECC blocks in the same manner as the plurality of data blocks.

4. The method of claim 3, wherein step (a) comprises the step of generating a number of ECC blocks which is dependent on the number of media servers over which the data blocks are allocated.

5. The method of claim 4, wherein step (a) comprises the step of using a number of ECC blocks which is approximately equal to the number of data blocks divided by the number of media servers over which the data blocks are allocated minus one.

6. The method of claim 1, wherein step (b) comprises the step of allocating the data blocks across each media server in proportion to each media server's available bandwidth.

7. The method of claim 1, wherein steps (a) and (b) are performed in a media client coupled to the network, and wherein steps (c) through (e) are performed separately in each of the media servers.

8. The method of claim 1, further comprising the steps of:

(f) from a media client, requesting that the data file be opened at a particular bandwidth;

(g) determining whether the data file can be opened at the requested bandwidth on the basis of previous bandwidth allocations made for the media server across which the data file was previously stored; and (h) responsive to a determination that the data file cannot be opened in step (g), denying the request to open the file.

9. The method of claim 1, further comprising the step of grouping the plurality of media servers into two or more teams, and wherein step (b) comprises the step of allocating the data blocks only to media servers within one of the two or more teams.

10. The method of claim 1, wherein step (c) comprises the step of using a bandwidth availability of the first-level I/O devices which is approximately:

MINIMUM{BW(a1), [BW(d1)+BW(d2)]}, where

BW(a1) is a bandwidth sustainable by a first-level I/O device a1,

BW(d1) is a bandwidth sustainable by a second-level I/O device d1, and

BW(d2) is a bandwidth sustainable by a second-level I/O device d2.

11. Apparatus for storing a data file across a plurality of media servers in a network, each media server having a plurality of first-level I/O devices and a plurality of second-level I/O devices, each second-level I/O device being controlled by one of the first-level I/O devices, the apparatus comprising:

means for dividing the data file into a plurality of data blocks;

means for allocating the plurality of data blocks across each of the plurality of media servers;

means for allocating each of the data blocks allocated to each media server to first-level I/O devices in that media server according to the bandwidth availability of the first-level I/O devices in that media server;

means for allocating each of the data blocks allocated to each first-level I/O device to second-level I/O devices controlled by that first-level I/O device in accordance with the bandwidth availability of the second-level I/O devices; and means for storing each of the data blocks onto the second-level I/O devices in accordance with the allocations to the second-level I/O devices.

12. The apparatus of claim 11, wherein said first-level I/O devices each comprise a disk controller, and wherein said second-level I/O devices each comprise a disk.

13. The apparatus of claim 11, further comprising means for generating a plurality of error-correcting code (ECC) blocks for correcting errors in the plurality of data blocks, wherein the plurality of ECC blocks are allocated and stored in the same manner as the plurality of data blocks.

14. The apparatus of claim 13, wherein the number of error-correcting code (ECC) blocks which are generated is dependent on the number of media servers over which the data blocks are allocated.

15. The apparatus of claim 14, wherein the number of ECC blocks generated is approximately equal to the number of data blocks divided by the number of media servers over which the data blocks are allocated minus one.

16. The apparatus of claim 11, wherein the data blocks are allocated across each media server in proportion to each media server's available bandwidth.

17. The method of claim 11, wherein the means for dividing the data file and the means for allocating the data blocks across each of the plurality of media servers is located at a media client coupled to the network, and wherein the means for allocating each of the data blocks to first-level I/O devices is replicated in each of the media servers.

18. The apparatus of claim 11, further comprising:

means for, from a media client, requesting that the data file be opened at a particular bandwidth;

means for determining whether the data file can be opened at the requested bandwidth on the basis of previous bandwidth allocations made for the media servers across which the data file was previously stored; and means, responsive to a determination that the data file cannot be opened at the requested bandwidth, denying the request to open the file.

19. The apparatus of claim 11, wherein the plurality of media servers are grouped into two or more teams, and wherein the data blocks are allocated only to media servers within one of the two or more teams.

20. The apparatus of claim 11, wherein the bandwidth availability of at least one of the first-level I/O devices which is approximately:

MINIMUM{BW(a1), [BW(d1)+BW(d2)]}, where

BW(a1) is a bandwidth sustainable by a first-level I/O device a1,

BW(d1) is a bandwidth sustainable by a second-level I/O device d1, and

BW(d2) is a bandwidth sustainable by a second-level I/O device d2.

21. A method of retrieving a data file previously stored across a plurality of media servers, the method comprising the steps of:

(a) from a media client, requesting that the data file be opened at a particular data bandwidth;

(b) determining whether enough data bandwidth remains, on the basis of allocations previously made for the media servers across which the data file was previously stored, to satisfy the request made in step (a);

(c) responsive to a determination in step (b) that sufficient bandwidth remains to satisfy the request, allocating the requested bandwidth toward the media servers across which the data file was previously stored; and (d) retrieving data blocks from the data file.

22. The method of claim 21, further comprising the step of denying the request made in step (a) if the determination in step (b) is negative.

23. The method of claim 21, further comprising the steps of:

(e) periodically measuring the actual data bandwidth used in retrieving the data blocks in step (d); and (f) responsive to a determination that the actual data bandwidth in step (e) has been exceeded, delaying one or more retrieval requests.

24. Apparatus for retrieving a data file previously stored across a plurality of media servers, comprising:

means for, from a media client, requesting that the data file be opened at a particular data bandwidth;

means for determining whether enough data bandwidth remains, on the basis of allocations previously made for the media servers across which the data file was previously stored, to satisfy the request;

means for, responsive to a determination that sufficient bandwidth remains to satisfy the request, allocating the requested bandwidth toward the media servers across which the data file was previously stored; and means for retrieving data blocks from the data file.

25. The apparatus of claim 24, further comprising means for denying the request if the determination is negative.

26. The apparatus of claim 24, further comprising:

means for periodically measuring the actual data bandwidth used in retrieving the data blocks; and means for, responsive to a determination that the actual data bandwidth has been exceeded, delaying one or more retrieval requests.

27. The apparatus of claim 6, wherein the means for periodically measuring the actual data bandwidth used comprises means for accumulating a bill for the media client based on the actual data bandwidth used.

28. A media server, comprising:

a plurality of disk devices for storing data;

a plurality of disk controllers, each of which controls one or more of the disk devices;

a network interface for interfacing with a network;

a client/server protocol, coupled to the network interface, for communicating with media clients on the network; and means, responsive to a request received from one of the media clients on the network, for allocating a plurality of data file blocks across the plurality of disk devices in accordance with a predetermined bandwidth availability determination, such that the number of data file blocks stored on each disk is approximately proportional to that disk's contribution to the predetermined bandwidth availability determination.

29. A video-on-demand system for storing and retrieving a video data file, comprising:

plurality of media servers connected via a network, each media server comprising a plurality of first-level I/O devices;

a plurality of second-level I/O devices each controlled by one of the first-level I/O devices;

means for allocating a plurality of video data blocks comprising portions of said video data tile to said first-level I/O devices according to the bandwidth availability of each of the first-level I/O devices;

means for further allocating each video data block allocated to each first-level I/O device to second-level I/O devices controlled by that first-level I/O device in accordance with the bandwidth availability of each of the second-level I/O devices; and means for storing each of the video data blocks onto the second-level I/O devices in accordance with the allocations to the second-level I/O devices; and a plurality of media clients connected to said network, each media client comprising means for requesting that said video data file be opened at a particular bandwidth;

means tier determining whether said video data file can be opened at the requested bandwidth on the basis of previous bandwidth allocations made for all media servers across which said video data file was previously stored; and means for, responsive to a determination that said video data file can be opened, reading said plurality of video data blocks from said plurality of media servers.

* * * * *